(Model.)
2 Sheets—Sheet 1.
J. B. GALLOWAY.
HINGE.
No. 347,341. Patented Aug. 17, 1886.
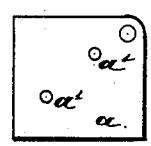 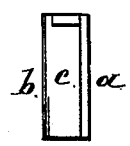 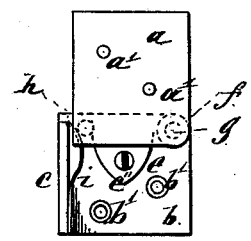 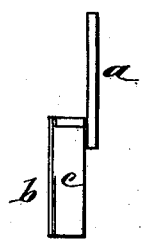
Fig. 1.  Fig. 2.  Fig. 3.  Fig. 4.
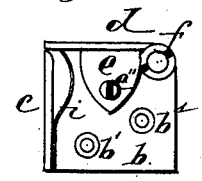 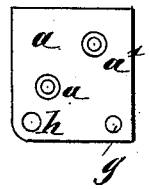 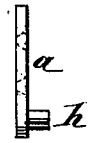 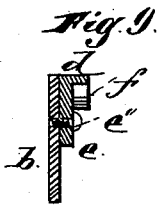
Fig. 5.  Fig. 6.  Fig. 7.  Fig. 9.
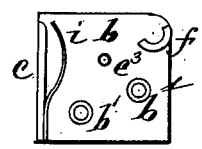  
Fig. 10.  Fig. 8.  Fig. 11.
Witnesses:
Albert H. Adams
Harry T. Jones
Inventor:
James B. Galloway (Model.) 2 Sheets—Sheet 2.

J. B. GALLOWAY.
HINGE.

No. 347,341. Patented Aug. 17, 1886.

Witnesses:
Albert H. Adams.
Harry F. Jones.

Inventor:
James B. Galloway

United States Patent Office.

JAMES B. GALLOWAY, OF CHICAGO, ILLINOIS.

HINGE.

SPECIFICATION forming part of Letters Patent No. 347,341, dated August 17, 1886.

Application filed July 29, 1884. Serial No. 139,121. (Model.)

*To all whom it may concern:*

Be it known that I, JAMES B. GALLOWAY, residing at Chicago, in the county of Cook and State of Illinois, and a citizen of the United States, have invented a new and useful Improvement in Hinges, of which the following is a full description, reference being had to the accompanying drawings, in which—

Figure 12:
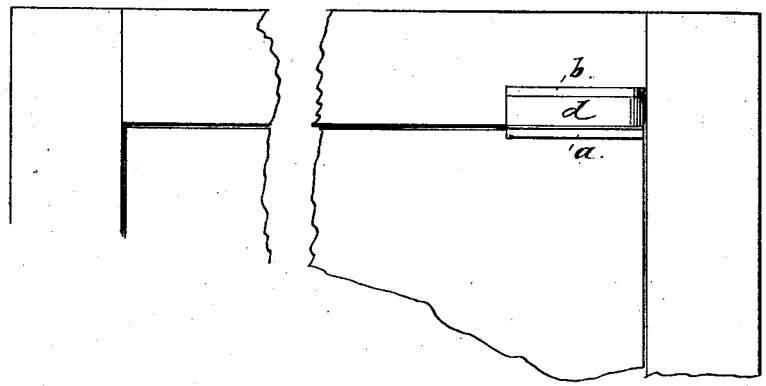
Figure 13:
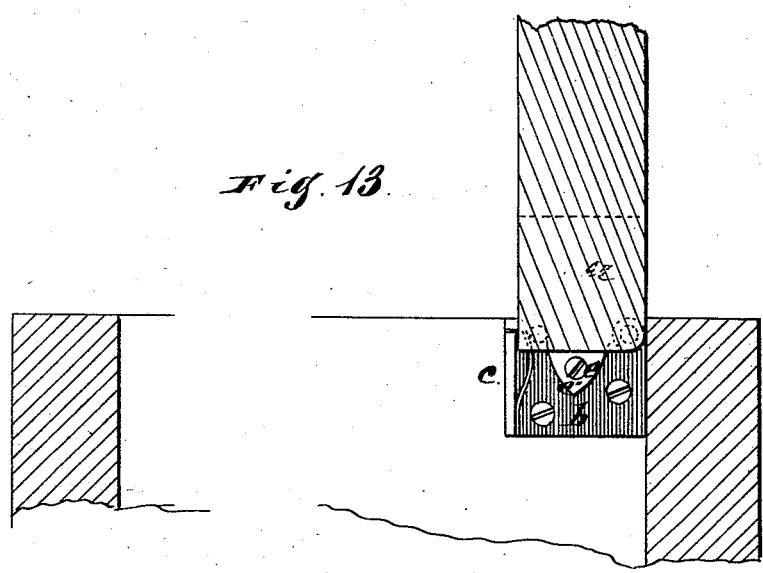

Figure 1 is a side elevation, and Fig. 2 an edge view, of the hinge closed; Fig. 3, a side elevation, and Fig. 4 an edge elevation, of the hinge open; Fig. 5, a side elevation showing the inner face of the stationary portion of the hinge; Fig. 6, an elevation showing the inner face of the movable portion of the hinge; Figs. 7 and 8, edge views of the movable portions of the hinge; Fig. 9, a sectional view of the stationary portion of the hinge; Fig. 10, an elevation showing the inner face of the stationary portion of the hinge with the stop and bearing-plate removed; Fig. 11, an elevation of the stop and bearing-plate; Fig. 12, a detail, being a top or plan view of one side of a box or case with the cover closed; and Fig. 13, a detail in section of a box or case with the cover open.

The object of this invention is to construct a hinge that can be applied edgewise to the ends of a cover or other movable object, so as to occupy but small space and furnish a means by which the cover or other object will be held open without liability of being accidentally closed; and its nature consists in the several parts and combinations of parts hereinafter more specifically described, and pointed out in the claims, as new for attaining the objects sought.

In the drawings, $a$ represents the movable portion of the hinge, formed of a plate of metal or other suitable material, and provided with transverse holes $a'$, for the passage of screws, by which the plate can be attached to the cover or other object that is to be hinged in position.

$b$ is the stationary portion of the hinge, also made of a plate of metal, and having openings $b'$, for the passage of screws, by which it is secured in position.

$c$ is a flange formed by turning one edge of the plate $b$, and furnishing the means for the attachment of the retaining-spring.

$d$ is a plate corresponding in width to the width of the flange $c$, and forming a top or cover for the hinge, and a guard or stop to prevent the movable portion from being turned too far.

$e$ is a heart-shaped piece attached to or formed with the cap $d$, and having an opening, $e'$, for the passage of a screw, $e''$, by means of which the cap $d$ is secured in position on the plate $b$.

$f$ is a bearing, one half or portion of which is formed on the end of the cap $d$, and the other is formed on the plate $b$, the two halves, when the cap $d$ is in position, forming the full bearing, as shown in Fig. 5.

$g$ is a pin located at one corner of the plate $a$, and adapted to enter the bearing $f$ and form the pintle or pivot on which the plate or movable portion $a$ of the hinge turns.

$h$ is a pin located on the plate $a$ at one corner, in line, or nearly so, with the pin $g$, and forming a stop-pin for controlling the movement of the plate or portion $a$ of the hinge. This pin $h$ describes an arc of a circle when the portion $a$ is moved, and the contour of the heart-shaped piece allows the pin $h$ to describe an arc of a circle necessary for its movement in opening and closing the hinge.

$i$ is a spring attached at one end to the flange $c$, and bent or curved so as to bear against the pin $h$ and form a retainer by which the movable plate or portion $a$ of the hinge will be maintained in its open position, as shown in Figs. 3 and 4, against ordinary jar or vibration.

The parts forming this hinge may be put together and attached to the cover and body in the following manner: The plate or portion $a$ is attached to the cover at the end and rear by suitable screws passing through the holes $a'$, in such manner that when the cover is down flat the pins $g$ $h$ will be in a vertical plane at the rear edge of the cover, the pin $g$ being the upper one. The plate $b$ is attached to the body at the rear side by suitable screws passing through the openings $b'$, in such manner as to bring the half-box for the bearing $f$ at the rear upper corner, with the flange $c$ and the spring thereon at the front. The pin or pintle $g$ is then dropped into the half-bearing on the portion $b$, and the cover or cap $d$ dropped into position to complete the journal or bearing $f$. The movable portion $a$ of the hinge is then turned up into its vertical position, and the heart-shaped piece e secured to b by the screw e", attaching the cap d firmly in position and completing the hinge.

The hinge, when in position, stands edgewise at the rear edge of the cover and occupies but little space, and enables the cover to be turned up and held in an elevated or open position without liability of accidentally dropping, and in use the cover can be turned up to the limit of where the pin h strikes the under face of the cap d, which forms a stop against further movement of the cover or other object to which the hinge is applied, and when in this position the spring i bears against the pin h and forms a support or retainer by which the cover or other object is maintained in its elevated or open position.

Instead of making the cap d and heart-shaped piece e of a single piece, such parts might be made of independent pieces, the heart-shaped piece being attached to the plate b by screws or otherwise, and the cap being likewise attached to the heart-shaped piece e, or the heart-shaped piece e might be cast or formed with the plate b; and instead of forming the bearing f of two half-boxes, as shown, the bearing might be formed of a single piece, either on the cap d or on the plate b; and instead of forming the heart-shaped piece e of a heart shape, as shown, the heart-shaped piece might be formed of a single curve on the side adjacent to the travel of the pin h; and instead of a cap to form a stop a pin or other device might be arranged for this purpose.

What I claim as new, and desire to secure by Letters Patent, is—

1. A hinge consisting of a plate, a, having pins g h, and a plate, b, having a part, e, and a bearing, f, substantially as and for the purpose specified.

2. The plate a, provided with pins g h, in combination with the plate b, having the flange c, cap d, guide e, bearing f, and spring i, substantially as and for the purpose specified.

JAMES B. GALLOWAY.

Witnesses:
 ALBERT H. ADAMS,
 HARRY T. JONES.